(12) United States Patent
Inui (10) Patent No.: US 8,059,209 B2
(45) Date of Patent: Nov. 15, 2011

(54) BROADCAST SIGNAL RECEIVING DEVICE AND METHOD

(75) Inventor: Yasuhiro Inui, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1141 days.

(21) Appl. No.: 11/830,941

(22) Filed: Jul. 31, 2007

(65) Prior Publication Data

US 2008/0028425 A1    Jan. 31, 2008

(30) Foreign Application Priority Data

Jul. 31, 2006    (JP) ................... 2006-207751

(51) Int. Cl.
*H04N 5/50*    (2006.01)
*H04N 5/44*    (2011.01)

(52) U.S. Cl. ........ 348/725; 348/731; 348/729; 348/732; 348/553; 725/38

(58) Field of Classification Search .......... 348/725, 348/729, 731, 732, 553, 462, 720; 725/38; 455/3.06, 3.02
See application file for complete search history.

(56) References Cited

U.S. PATENT DOCUMENTS

| 7,036,032 | B2* | 4/2006 | Mizuyabu et al. ............ 713/323 |
| 7,747,214 | B2* | 6/2010 | Kim et al. .................... 455/3.01 |
| 2002/0186327 | A1* | 12/2002 | Inui et al. ..................... 348/732 |
| 2004/0250292 | A1 | 12/2004 | Okamoto et al. | |

FOREIGN PATENT DOCUMENTS

| JP | 2002-077748 | 3/2002 |
| JP | 2004-364216 | 12/2004 |

* cited by examiner

*Primary Examiner* — Jefferey Harold
*Assistant Examiner* — Jean W Desir
(74) *Attorney, Agent, or Firm* — Global IP Counselors (57) ABSTRACT

A broadcast signal receiving device includes a receiving unit, a registering unit and a channel selection unit. The receiving unit receives digital broadcast signals including a plurality of sub-channels on each of a plurality of physical channels. The registering unit registers an indicator indicating whether or not each of the sub-channels is an audio channel in an indicator registration region of a channel map, which stores channel map information relating to a correspondence between the physical channels and the sub-channels. The channel selection unit selects the sub-channels based on the channel map information and the indicator stored in the indicator registration region.

16 Claims, 6 Drawing Sheets

| Physical CH (R1) | Virtual CH (R2) | SUB CH (R3) / Audio CH Information | | | | | |
|---|---|---|---|---|---|---|---|
| ⋮ | ⋮ | ⋮ | | | | | |
| 10 | – | | | | | | |
| 11 | 26 | 1 | 2 | 3 | | | |
|    |    | – | – | A | | | |
| 12 | – | | | | | | |
| 13 | 10 | 1 | 2 | 3 | 4 | 5 | |
|    |    | – | – | A | A | – | |
| 14 | 28 | 1 | 2 | 3 | 4 | 5 | |
|    |    | A | A | A | – | – | |
| ⋮ | ⋮ | ⋮ | | | | | |

| Physical CH | Virtual CH | SUB Ch / Audio Ch Information | | | | |
|---|---|---|---|---|---|---|
| 1 | – | | | | | |
| 2 | 2 | 1 / – | 2 / A | 3 / A | 4 / – | |
| ⋮ | ⋮ | | | | | |
| 133 | – | | | | | |
| 134 | 4 | 1 / – | 2 / – | | | |
| 135 | 99 | 1 / – | 2 / – | 3 / A | 4 / A | 5 / – |

R1 → Physical CH
R2 → Virtual CH
R3 → SUB Ch

Channel Down Shift To Audio Channel From Video Channel

BROADCAST SIGNAL RECEIVING DEVICE AND METHOD

CROSS-REFERENCE TO RELATED APPLICATIONS

This application claims priority to Japanese Patent Application No. 2006-207751 filed on Jul. 31, 2006. The entire disclosure of Japanese Patent Application No. 2006-207751 is hereby incorporated herein by reference.

BACKGROUND OF THE INVENTION

1. Field of the Invention

The present invention generally relates to a broadcast signal receiving device and a method. More specifically, the present invention relates to a broadcast signal receiving device and a method for receiving digital broadcast signals.

2. Background Information

In recent years, digital broadcast signals that conform to ATSC (Advanced Television Systems Committee) standards have been broadcast from broadcasting stations in North America. Broadcast signal receiving devices (or set-top boxes, hereinafter "STB") are becoming more popular. The STB receives the digital broadcast signals and converts the digital broadcast signals into signals that can be received by television receivers that handle existing NTSC (National Television Systems Committee) analog broadcasts.

In the digital broadcasts that conform to ATSC standards, the digital broadcast signals are transmitted on physical channels that differ from the physical channels of analog broadcast signals. A single physical channel contains one or more sub-channels used to transmit one or more types of content. Virtual channel numbers are assigned to the sub-channels. The virtual channel numbers include a sub-channel number and a number that is the same as the physical channel number of the analog broadcast that is transmitted from the same broadcasting station or from a broadcasting station in the same broadcast network. Accordingly, virtual channels are constructed in a hierarchical manner from the physical channels and the sub-channels.

The digital broadcast signals include video signals, audio signals and control signals. In the digital broadcasts conforming to ATSC standards, a PSIP (program and system information protocol) is obligatorily attached to the control signals. The PSIP contains information relating to the virtual channel number and the name of the broadcasting station. A control unit of the STB specifies the virtual channel number that is received by referring to a VCT (virtual channel table) that is obtained by acquiring and analyzing the PSIP. Since the virtual channels are constructed in the hierarchical manner from the physical channels and the sub-channels and the construction is complex, it is difficult for users to understand the construction of a channel that is selected by the users.

In the STB, a channel map (or channel table) is provided in which physical channel numbers, virtual channel numbers and sub-channel numbers are registered. The channel map is opened in a RAM of the STB and used when channels are shifted up or down.

Specifically, with a conventional STB, categories of the digital broadcasts indicating television broadcasting, radio broadcastings or data broadcasting are selected by keys. When an up or down key is pressed in a state in which one of the categories has been selected, only channels belonging to the one of the categories are successively selected (see Japanese Laid-Open Patent Application No. 2002-77748, for example).

With another conventional STB, a channel map is created. The channel map indicates whether or not each of channels is being broadcast. When a channel up or down key is operated by a user, only channels being broadcast are selected by using the channel map (see Japanese Laid-Open Patent Application No. 2004-364216).

In the digital broadcasts in the United States, especially cable digital broadcasts, radio channels (hereinafter "audio channels") mainly broadcasting audio are mixed with ordinary channels such as television channels or the like (hereinafter "video channels"). Some broadcasting stations broadcast many of the audio channels. If the audio channels are registered in the channel map mixed with the video channels, it becomes difficult to select a desired video channel using a channel up or down key. As a result, the STB becomes difficult to use.

In view of the above, it will be apparent to those skilled in the art from this disclosure that there exists a need for an improved broadcast signal receiving device. This invention addresses this need in the art as well as other needs, which will become apparent to those skilled in the art from this disclosure.

SUMMARY OF THE INVENTION

The present invention was conceived in light of the above problems. It is one object of the present invention to provide a broad cast signal receiving device with which a desired video channel is easily selected even if audio channels are mixed with video channels.

In accordance with one aspect of the present invention, a broadcast signal receiving device includes a receiving unit, a registering unit and a channel selection unit. The receiving unit receives digital broadcast signals including a plurality of sub-channels on each of a plurality of physical channels. The registering unit registers an indicator indicating whether or not each of the sub-channels is an audio channel in an indicator registration region of a channel map, which stores channel map information relating to a correspondence between the physical channels and the sub-channels. The channel selection unit selects the sub-channels based on the channel map information and the indicator stored in the indicator registration region.

With the broad cast signal receiving device, it is possible to provide a broad cast signal receiving device with which a desired video channel is easily selected even if audio channels are mixed with video channels.

These and other objects, features, aspects and advantages of the present invention will become apparent to those skilled in the art from the following detailed descriptions, which, taken in conjunction with the annexed drawings, discloses selected embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

A first embodiment of the present invention will now be described through reference to FIGS. 1 to 6.

Figure 1:
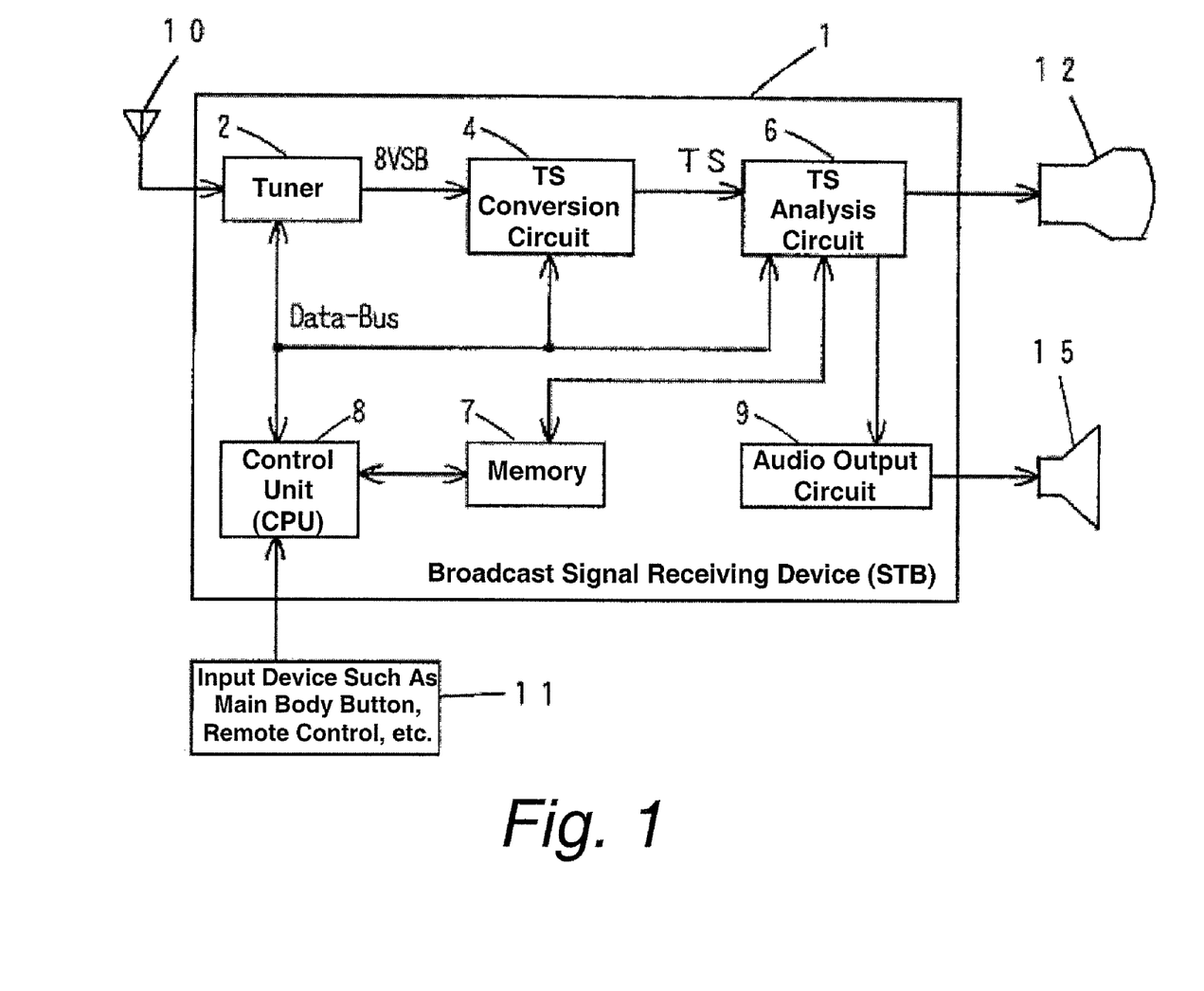
FIG. 1 is a functional block diagram showing a broadcast signal receiving device of the present invention.

As shown in FIG. 1, a broadcast signal receiving device 1 (or set-top box, hereinafter "STB") receives encoded digital broadcast signals via an antenna 10. The digital broadcast signals conform to ATSC (Advanced Television Systems Committee) standards. The digital broadcast signals are transmitted from a television broadcasting station. The STB 1 receives the digital broadcast signals in accordance with a user operating an input device 11, such as a main body button, remote control or the like to change a channel or perform another operating input. The STB 1 converts the digital broadcast signals to image signals that conform to NTSC standards and displays the image signals on a display device (or display unit) 12. The channel is changed by inputting a channel number directly using a ten-key keypad (numerical keys) disposed on the input device 11. Also, the channel is changed to a neighboring channel above or below by operating a channel up or down key disposed on the input device 11.

The STB 1 specifies a virtual channel number that is received by acquiring and analyzing a PSIP (program and system information protocol) so that the user can also instantly comprehend the virtual channel number when the user changes the channels by operating the channel up or down key. The STB 1 also makes the virtual channel number display on the display device 12 that has an OSD (on screen display) function. In the ATSC standards, the digital broadcast signals are packetized by a moving picture compression according to MPEG (Moving Picture Experts Group)-2 standards.

The STB 1 includes a tuner (or a receiving unit) 2, a TS (transport stream) conversion circuit 4, a TS analysis circuit 6, memory 7, a control unit 8 and an audio output circuit 9.

The tuner 2 receives the digital broadcast signals via the antenna 10. The digital broadcast signals are transmitted by an 8VSB (vestigial side band) modulation system. The tuner 2 is tuned in to a frequency band in accordance with a channel inputted into the control unit 8 from the input device 11 by the user. Then, the digital broadcast signals that is present in the frequency band corresponding to the inputted channel are received.

The TS conversion circuit 4 converts the digital broadcast signals received by the tuner 2 into TS signals. In the TS signals, video signals, audio signals and control signals are multiplexed.

The TS analysis circuit 6 analyzes the TS signals and demultiplexes the TS signals to the video signals, the audio signals and the control signals. The TS analysis circuit 6 also decodes the video signals, the audio signals and the like. Specifically, the TS analysis circuit 6 decodes the video signals to the image signals and displays the image signals on the display device 12.

Figure 2:
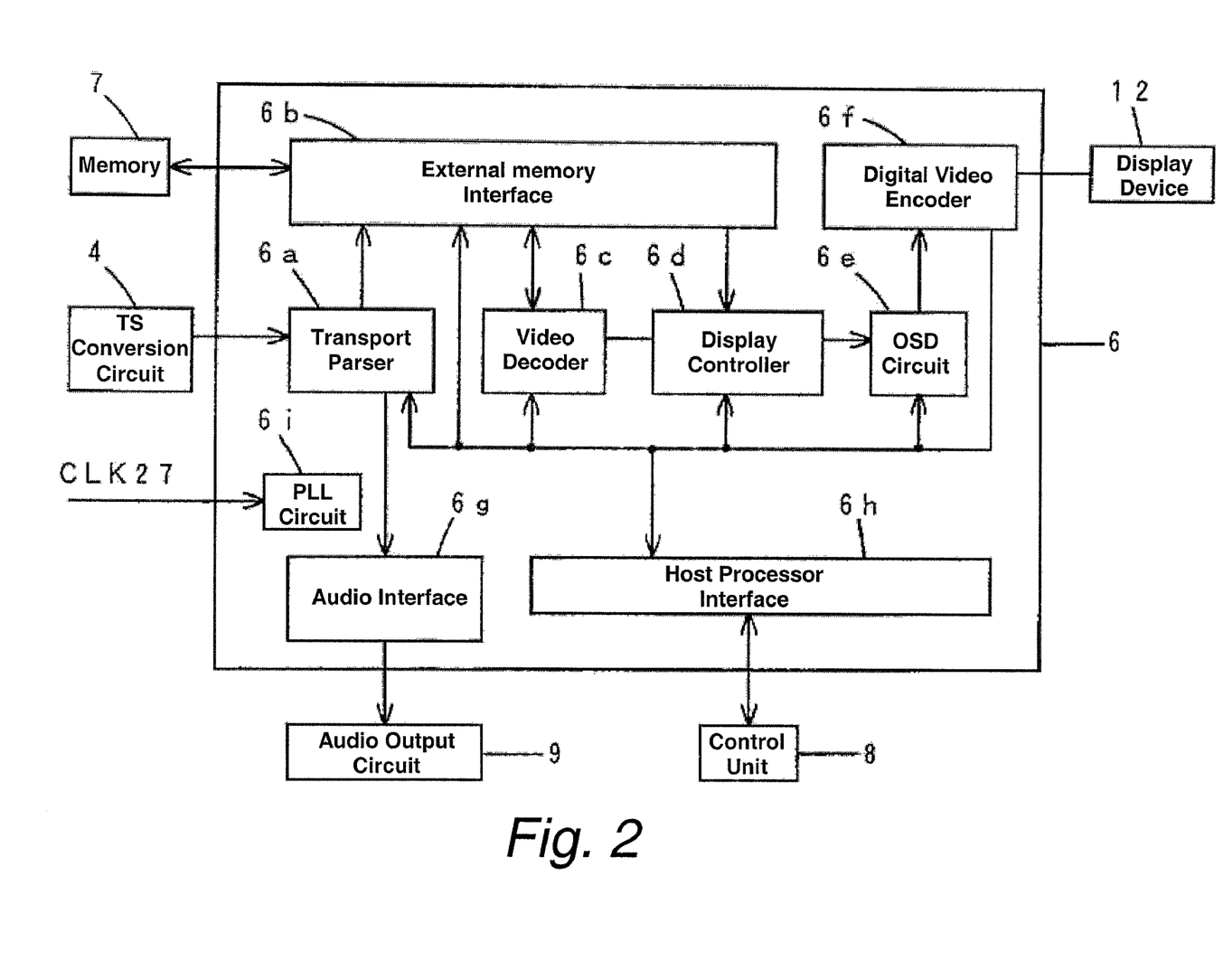
FIG. 2 is a detailed block structural diagram of a TS analysis circuit.

Referring to FIG. 2, the TS analysis circuit 6 includes a transport parser 6a, an external memory interface 6b, a video decoder 6c, a display controller 6d, an OSD circuit 6e, a digital video encoder 6f, an audio interface 6g, a host processor interface 6h and a PLL (phase locked loop) circuit 6i.

The transport parser 6a acquires the TS signals from the TS conversion circuit 4 and demultiplexes the TS signals to the video signals, the audio signals and the control signals. The external memory interface 6b receives commands from the control unit 8 via the host processor interface 6h. Then, the external memory interface 6b controls connections of the transport parser 6a, the video decoder 6c, the display controller 6d and memory 7. Specifically, the video signals, the audio signals and the control signals are respectively stored in the memory 7 via the external memory interface 6b.

The video decoder 6c receives commands from the control unit 8. Then, the video decoder 6c reads out and decodes the video signals stored in the memory 7. The display controller 6d receives commands from the control unit 8 and converts the video signals decoded by the video decoder 6c into NTSC video signals. The OSD circuit 6e receives commands from the control unit 8 and sends out the NTSC video signals to the digital video encoder 6f. The OSD circuit 6e also sends out signals produced by adding OSD signals to the video signals to the digital video encoder 6f if necessary. In accordance with commands from the control unit 8, the OSD circuit 6e performs calculation that adds the OSD signals to each of frames of the video signals. As a result, the OSD signals of specified colors are displayed on the display device 12. The OSD circuit 6e has a memory in order to perform the calculation.

The digital video encoder 6f receives commands from the control unit 8 and converts the video signals sent out from the OSD circuit 6e into the analog image signals. Then, the digital video encoder 6f outputs the image signals to the display device 12. The audio interface 6g sends out the audio signals produced by the transport parser 6a to the audio output circuit 9. The host processor interface 6h transmits commands from the control unit 8 to the transport parser 6a, the external memory interface 6b, the video decoder 6c, the display controller 6d, the OSD circuit 6e and the digital video encoder 6f. The PLL circuit 6i makes a local oscillation frequency coincide with a specific frequency on the basis of an input clock signal 27.

The memory 7 stores channel information, channel map information, menu items and the like. The channel information is information relating to transmission frequencies of physical channels of the digital broadcast signals, a broadcast language and the like. The channel map information is information relating to a correspondence between the physical channels and sub-channels contained in the physical channels. The channel map information is registered in a channel map (or channel table) by scanning an entire frequency band of the digital broadcast signals at a time of an initial setting of the STB 1. The channel map information is used when the channels are changed. The menu items are information relating to settings of the STB 1. The memory 7 further stores MPEG-2 data obtained by the transport parser 6a.

The audio output circuit 9 extracts the audio signals of a specified broadcast language and outputs sound signals to a speaker device 15. Specifically, the audio output circuit 9 converts the audio signals acquired from the audio interface 6g into the sound signals for the speaker device 15. Then, the audio output circuit 9 outputs the sound signals to the speaker device 15. Specifically, the audio output circuit 9 extracts the audio signals relating to the broadcast language indicated by the control unit 8. Then, the audio output circuit 9 decodes the audio signals and converts the audio signals into the analog sound signals.

The input device 11 is a device to input operating commands such as channel changes or the like made by the user into the control unit 8. The input device 11 includes a main body button disposed on the front surface of the STB 1, a remote control using infrared rays or the like. The display device 12 is a display screen of a television receiver, a CRT or a flat panel display device such as an LCD (liquid crystal display), PDP (plasma display panel) or the like. If the display device 12 handles an input of digital image signals, the OSD circuit 6e may be directly connected to an input terminal of the display device 12 without interposing the digital video encoder 6f. The speaker device 15 is connected to the audio output circuit 9 and outputs sound based on the analog sound signals processed by the audio output circuit 9.

The control unit 8 is a device such as a CPU. The control unit 8 receives input operations from the input device 11 and controls the STB 1 via a data bus. Specifically, the control unit 8 reads out and analyzes the PSIP contained in the control signals stored in the memory 7. Then, the control unit 8 acquires the virtual channel number of a received channel based on status signals contained in the PSIP. The control unit 8 outputs the virtual channel number to the display device 12 via the OSD circuit 6e and the digital video encoder 6f.

Figure 6:
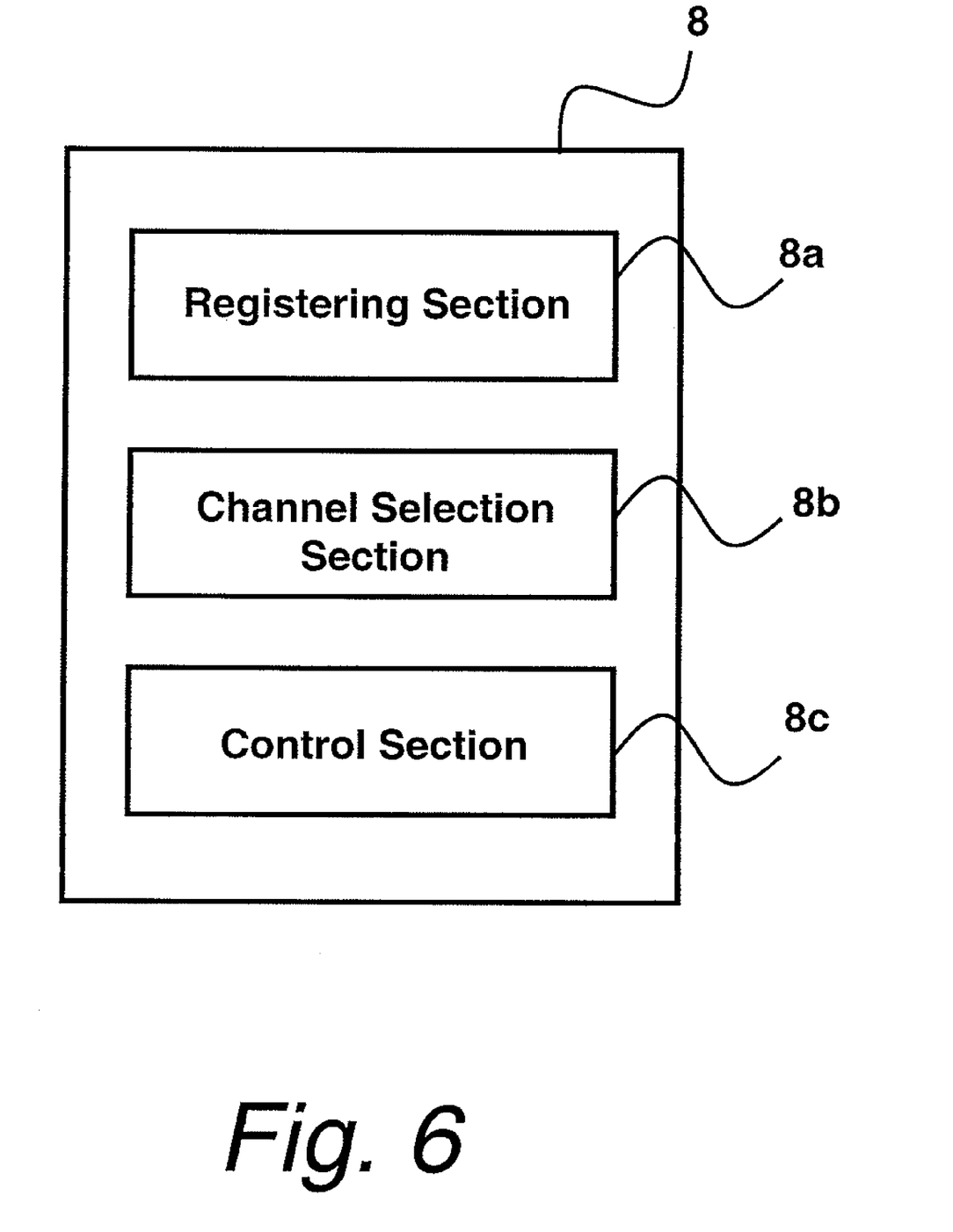
FIG. 6 is a block diagram showing a functional configuration of a control unit.

FIG. 6 is a block diagram showing a functional configuration of the control unit 8. The control unit 8 includes a registering section (or registering unit) 8a, a channel selection section (or channel selection unit) 8b and a control section (or display control unit) 8c. The registering section 8a registers audio channel indicators (or indicators) in the channel map so as to determine between video channels and audio channels. The channel selection section 8b performs a channel selection operation. In the channel selection operation, the sub-channels are selected based on the channel map information and the audio channel indicators. The control section 8c controls respective parts of the STB 1.

Figure 3:
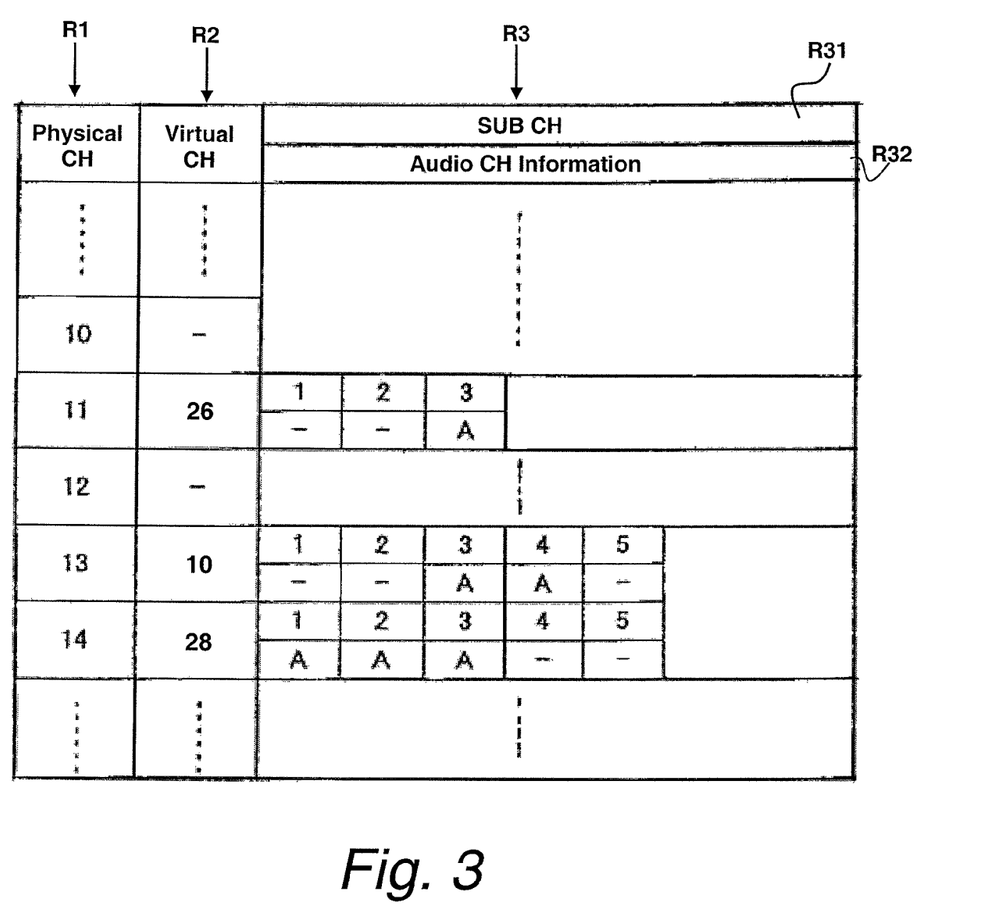
FIG. 3 is an explanatory diagram showing a construction of a channel map stored in a memory.

As shown in FIG. 3, the channel map is a table that stores the physical channel numbers, the virtual channel numbers and the sub-channel numbers on which programs are broadcast. In the channel map, the physical channel numbers correspond to the virtual channel numbers and the sub-channel numbers. The channel map has physical channel regions R1, virtual channel regions R2 and sub-channel regions R3. Each of the physical channel regions R1 correspond to each of the virtual channel regions R2 and each of the sub-channel regions R3. The physical channel regions R1 store the physical channel numbers. The virtual channel regions R2 store the virtual channel numbers. The sub-channel regions R3 further include channel number regions R31 and audio registration regions (or indicator registration regions) R32. Each of the channel number regions R31 corresponds to each of the audio registration regions R32. Furthermore, each of the sub-channel regions R3 is constructed into two tiers, i.e., upper and lower tiers. The channel number regions R31 located in the upper tiers store the sub-channel numbers. The audio registration regions R32 located in the lower tiers store the audio channel indicators that are registered by the control unit 8. The audio channel indicators indicate whether or not each of the sub-channels is an audio channel. In other words, the audio channel indicators indicate that the sub-channels having the audio channel indicators in the corresponding lower tiers are the audio channels.

The channel map information is registered by scanning the entire broadcast signal frequency band (full-band scanning) at the time of the initial setting of the STB 1 or the like. Then, the registering section 8a determines whether or not each of the channels is being broadcast. At the same time, the registering section 8 determines whether or not each of the received sub-channels is the audio channel. When one of the sub-channels is the audio channel, the registering section 8a of the control unit 8 registers the audio channel indicator (indicated by "A" in FIG. 3) in one of the audio registration regions corresponding to the one of the sub-channels. Furthermore, in regard to the channel map information, the full-band scanning is performed when an updating instruction is inputted from the input device 11. During the full-band scanning, an updating processing of the channel map information is performed. At the same time, an updating processing for the audio registration region is also performed.

The registration of the audio channels may be started by a manual operation performed by the user. Specifically, the registration may be started by following a menu screen displayed on the display device 12. After the user recognizes that a content of the sub-channel is an audio channel, the user registers the sub-channel as the audio channel. Furthermore, the menu screen may include an audio channel registration button or the like. The control unit 8 registers the audio channel indicator "A" in the audio registration region R32 of the corresponding sub-channel in the channel map as a result of the user operating the audio channel registration button or the like.

Next, audio channel determining methods for determining whether or not each of the sub-channels that is received is the audio channel will be explained. The audio channel determining methods is performed by the registering section 8a. All of the methods described below conform to MPEG-2 standards. The audio channel determining methods includes (1) determining methods based on PMT (Program Map Table) and (2) determining methods based on VCT (Virtual Channel Table). At least one of the determining methods based on PMT and the determining methods based on VCT is used by the registering section 8a to determine whether or not each of the sub-channels is the audio channel.

(1) Determining Methods Based on PMT

The determining methods based on PMT are performed on the basis of information in the PMT conforming to the ATSC standards. The determining methods based on PMT include the following methods (1-1) to (1-4-5). At least one of the methods (1-1) to (1-4-5) is used to determine whether or not each of the sub-channels is the audio channel when the determining methods based on PMT are used.

(1-1) If a PCRPID (program clock reference packet identifier) of a PMT for a sub-channel has an ineffective value "0x1FFF", the sub-channel is determined to be an audio channel.

(1-2) If a PCRPID of a PMT for a sub-channel coincides with an AUDIOPID (audio packet identifier) of the same PMT, the sub-channel is determined to be an audio channel.

(1-3) If a VIDEOPID (video packet identifier) is not described in a PMT for a sub-channel, the sub-channel is determined to be an audio channel.

(1-4-1) If audio signals are properly demodulated and a value other than "00" is described in a transport_scrambling_control bit in an MPEG-2 TS packet header of video signals of a sub-channel, the sub-channel is determined to be an audio channel.

(1-4-2) If audio signals are properly demodulated and a value other than "0x000001" is described in a packet_start_code_prefix of an MPEG-2 PES (packetized elementary stream) packet header of video signals of a sub-channel, the sub-channel is determined to be an audio channel.

(1-4-3) If audio signals are properly demodulated and a value other than "0x0" is described in a PES_scrambling_ control bit in an MPEG-2 PES packet of video signals of a sub-channel, the sub-channel is determined to be an audio channel.

(1-4-4) If audio signals are properly demodulated and a time of 5 to 10 seconds is required from an initiation of a decoding of video signals of a sub-channel to an acquisition of an MPEG-2 sequence header, the sub-channel is determined to be an audio channel. If a received channel is a video channel (program channel), the sequence header is ordinarily transmitted at intervals of about 1 second. Accordingly, the determination is accomplished by investigating an acquisition time of the sequence header. Furthermore, the time of 5 to 10 seconds described above is an example. A time of 2 to 3 seconds or the like may also be used.

(1-4-5) If audio signals are properly demodulated and an MPEG-2 sequence header is not acquired even after a time of 10 seconds or more has elapsed from an initiation of a decoding of video signals of a sub-channel, the sub-channel is determined to be an audio channel. The time of 10 seconds described above is an example. As long as it can be reliably judged that the MPEG-2 sequence header is not acquired, a time that is shorter than the time may be used.

(2) Determining Methods Based on VCT

The determining methods based on VCT are performed on the basis of information in the VCT conforming to the ATSC standards. The determining methods based on VCT include the following methods (2-1) to (2-4-5). At least one of the methods (2-1) to (2-4-5) is used to determine whether or not each of the sub-channels is the audio channel when the determining methods based on VCT are used. Furthermore, the VCT includes a terrestrial VCT (TVCT) or a cable VCT (CVCT).

(2-1) If a PCRPID in a VCT for a sub-channel loop has an ineffective value "0x1FFF", the sub-channel is determined to be an audio channel.

(2-2) If a value "0x03" (indicating ATSC audio) is described in service_type in a VCT for a sub-channel loop, the sub-channel is determined to be an audio channel.

(2-3) If a PCRPID in a VCT for a sub-channel loop coincides with an AUDIOPID defined by a service location descriptor in the same sub-channel loop, the sub-channel is determined to be an audio channel.

(2-4-1) If audio signals are properly demodulated and a value other than "00" is described in a transport_scrambling_ control bit in an MPEG-2 TS packet header of video signals of a sub-channel, the sub-channel is determined to be an audio channel.

(2-4-2) If audio signals are properly demodulated and a value other than "0x00001" is described in a packet_start_ code_prefix of an MPEG-2 PES packet of video signals of a sub-channel, the sub-channel is determined to be an audio channel.

(2-4-3) If audio signals are properly demodulated and a value other than "0x0" is described in a PES_scrambling control bit in an MPEG-2 PES packet of video signals of a sub-channel, the sub-channel is determined to be an audio channel.

(2-4-4) If audio signals are properly demodulated and a time of 5 to 10 seconds is required from an initiation of a decoding of video signals of a sub-channel to an acquisition of an MPEG-2 sequence header, the sub-channel is determined to be an audio channel. If a received channel is a video channel (program channel), the sequence header is ordinarily transmitted at intervals of about 1 second. Accordingly, the determination is accomplished by investigating an acquisition time of the sequence header. Furthermore, the time of 5 to 10 seconds described above is an example. A time of 2 to 3 seconds or the like may also be used.

(2-4-5) If audio signals are properly demodulated and an MPEG-2 sequence header is not acquired even after a time of 10 seconds or more has elapsed from an initiation of a decoding of video signals of a sub-channel, the sub-channel is determined to be an audio channel. The time of 10 seconds described above is an example. As long as it can be reliably judged that the MPEG-2 sequence header is not acquired, a time that is shorter than the time may be used.

The channel selection section $8b$ of the control unit 8 performs the channel selection operation. The channel selection operation determines between the video channels and the audio channels by using the channel map that is registered in the memory 7. The channel selection operation includes (1) a video channel selection operation, (2) an audio channel selection operation, (3) an up shifting operation and (4) a down shifting operation.

(1) Video Channel Selection Operation

The channel selection section $8b$ performs the video channel selection operation. In the video channel selection operation, sub-channels for which the audio channel indicators "A" are registered in the channel map are skipped while channels are shifted up or down with the channel up or down key of the input device 11.

Specifically, referring to FIG. 3, when the channel up key of the input device 11 is operated in a state in which a video channel on the sub-channel 2 in the physical channel 13 is displayed on the display device 12, the channel selection section $8b$ skips the sub-channels 3 and 4 for which the audio channel indicators "A" are registered. Then, a video channel on the sub-channel 5 in the physical channel 13 is displayed on the display device 12. Furthermore, when the channel up key of the input device 11 is further operated in this state, the channel selection section $8b$ selects the next physical channel 14, skips the sub-channels 1, 2 and 3 for which the audio channel indicators "A" are registered. Then, a video channel on the sub-channel 4 in the physical channel 14 is displayed on the display device 12. Furthermore, video channels alone are successively selected while skipping audio channels in a similar manner when the channel down key is operated as well. As a result, the user can successively shift video channels alone up or down while skipping audio channels by operating the channel up or down key.

(2) Audio Channel Selection Operation

The channel selection section $8b$ performs the audio channel selection operation. In the audio channel selection operation, only sub-channels for which the audio channel indicators "A" are registered in the channel map are shifted up or down while channels are shifted up or down with the channel up or down key of the input device 11.

Specifically, referring to FIG. 3, when the channel up key of the input device 11 is operated in a state in which an audio channel on the sub-channel 4 in the physical channel 13 is being outputted from an internal speaker of the display device 12 or from the speaker device 15, the channel selection section $8b$ skips the sub-channel 5 in the physical channel 13. Then, an audio channel on the sub-channel 1 in the next physical channel 14 is outputted. Furthermore, audio channels alone are successively selected while skipping video channels in a similar manner when the channel down key is operated. As a result, the user can successively shift audio channels alone up or down while skipping video channels by operating the channel up or down key.

(3) Up Shifting Operation

The channel selection section 8b performs the up shifting operation. In the up shifting operation, audio channels are skipped while video channels are shifted up with operating the channel up key of the input device 11. Furthermore, when the channel up key is operated after the channel reaches a video channel on a maximum channel, an audio channel on a minimum channel is selected. Here, the video channel on the maximum channel is a video channel having a maximum physical channel number and a maximum sub-channel number. The audio channel on the minimum channel is an audio channel having a minimum physical channel number and a minimum sub-channel number.

Figure 4:
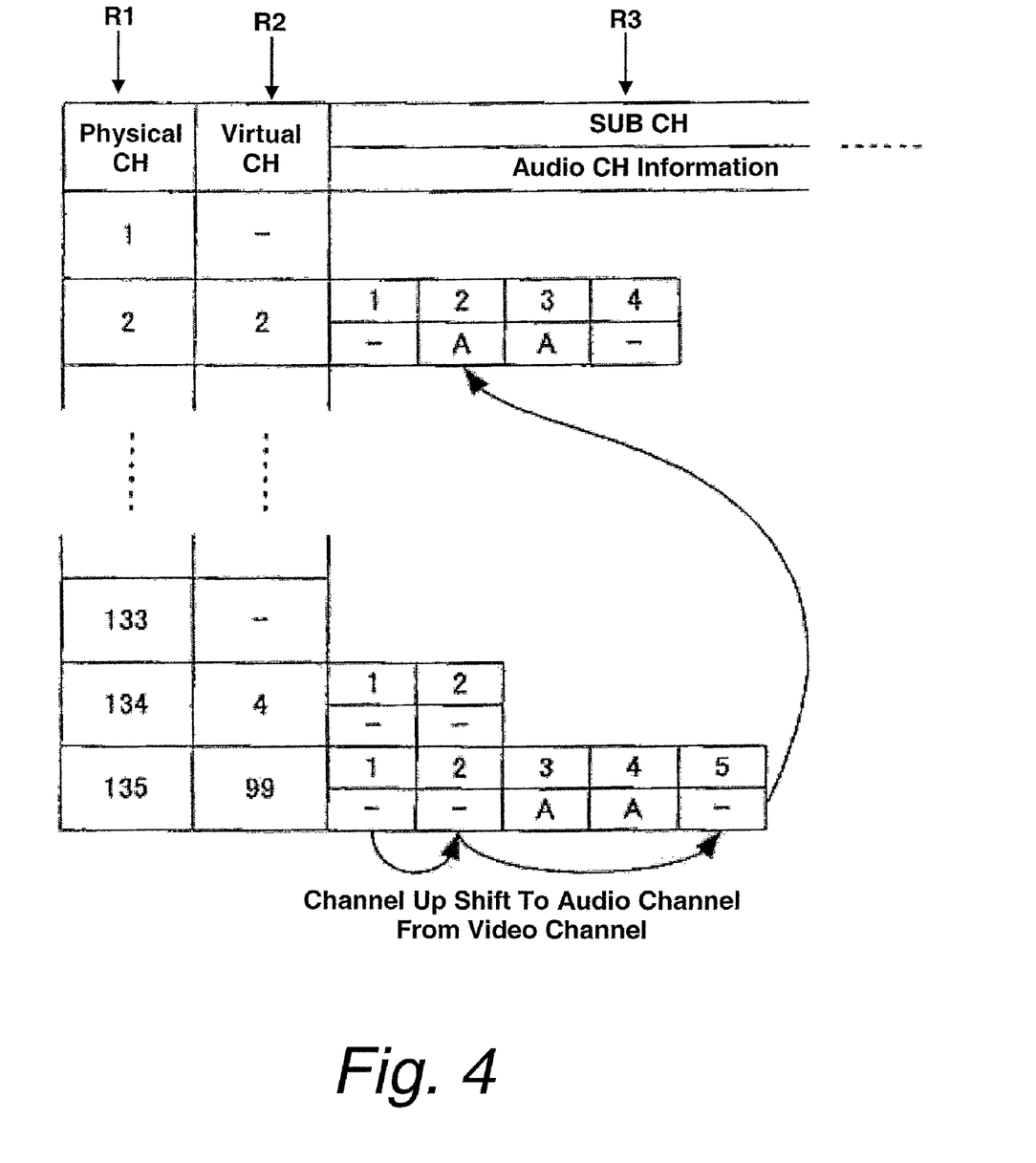
FIG. 4 is an explanatory diagram illustrating an up shifting operation.

Specifically, referring to FIG. 4, when the channel up key of the input device 11 is operated in a state in which a video channel on the sub-channel 1 in the maximum physical channel 135 is being displayed on the display device 12, the control section 8c displays a video channel on the next sub-channel 2 on the display device 12. When the channel up key of the input device 11 is operated in this state, the channel selection section 8b skips the next sub-channels 3 and 4 for which the audio channel indicators "A" are registered. Then, the control section 8c displays a video channel on the sub-channel 5 on the display device 12. Furthermore, when the channel up key of the input device 11 is further operated in this state, the channel selection section 8b selects the minimum physical channel 2 (in FIG. 4, the physical channel 1 is not broadcast). Then, the channel selection section 8b skips the video channels and selects an audio channel on the sub-channel 2. As a result, the audio channel on the sub-channel 2 is outputted from an internal speaker of the display device 12 or from the speaker device 15. Subsequently, when the channel up key is operated, only the audio channels are successively selected while the video channels are skipped.

Furthermore, when the channel up key of the input device 11 is operated after the channel reaches an audio channel on a maximum channel, a video channel on a minimum channel is selected. Here, the audio channel on the maximum channel is an audio channel having a maximum physical channel number and a maximum sub-channel number. The video channel on the minimum channel is a video channel having a minimum physical channel number and a minimum sub-channel number.

(4) Down Shifting Operation

The channel selection section 8b performs the down shifting operation. In the down shift operation, audio channels are skipped while video channels are shifted down with operating the channel down key of the input device 11. Furthermore, when the channel down key is operated after the channel reaches the video channel on the minimum channel, the audio channel on the maximum channel is selected.

Figure 5:
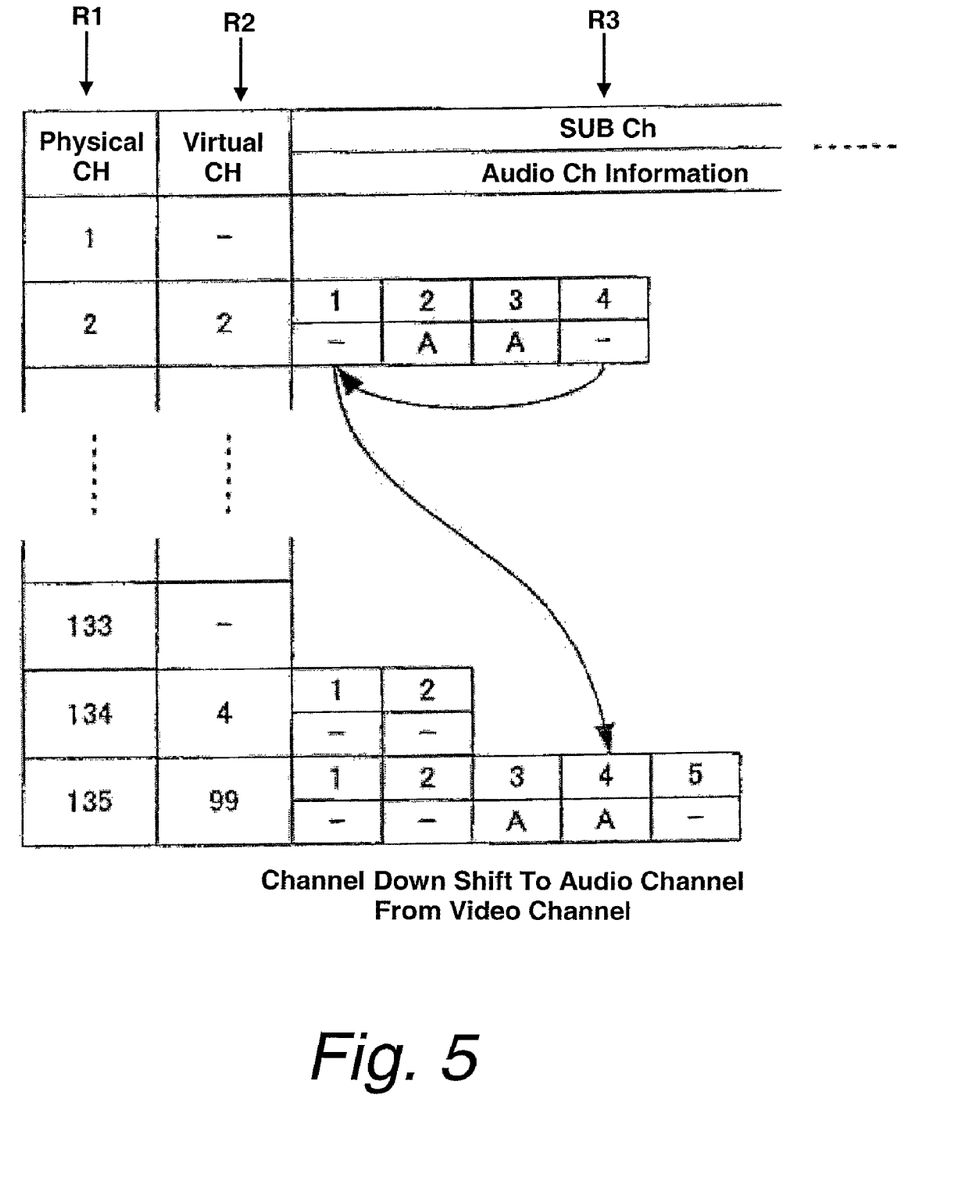
FIG. 5 is an explanatory diagram illustrating a down shifting operation.

Specifically, referring to FIG. 5, when the channel down key of the input device 11 is operated in a state in which a video channel on the sub-channel 4 in the minimum physical channel 2 (in FIG. 5, the physical channel 1 is not broadcast) is being displayed on the display device 12, the channel selection section 8b skips audio channels on the sub-channels 3 and 2. Then, the control section 8c displays a video channel on the next sub-channel 1 on the display device 12. When the channel down key of the input device 11 is operated in this state, the channel selection section 8b selects the maximum physical channel 135 and then skips the video channels. Then, the channel selection section 8b selects an audio channel on the maximum sub-channel 4 in the maximum physical channel 135. As a result, the audio channel on the sub-channel 4 is outputted from the internal speaker of the display device 12 or from the speaker device 15. Subsequently, when the channel down key is operated, only the audio channels are successively selected while the video channels are skipped.

Furthermore, when the channel down key of the input device 11 is operated after the channel reaches the audio channel on the minimum channel, a video channel on the maximum channel is selected.

With the STB 1, it is possible to provide a broad cast signal receiving device with which the video channels are easily selected despite the audio channels are mixed with the video channels. Specifically, with the channel up or down key of the input device 11, only the video channels or only the audio channels are continuously selected. As a result, user convenience is improved.

Other Embodiments

Other embodiments will now be explained. In view of the similarity, the parts of the other embodiments that are identical to the parts of the first embodiment will be given the same reference numerals as the parts of the first embodiment. Moreover, the descriptions of the parts of the other embodiments that are identical to the parts of the first embodiment may be omitted for the sake of brevity.

(1) The input device 11 has a selection key or a switching key for setting the channel selection section 8b to select either a video channel shifting mode or an audio channel shifting mode. In other words, the channel selection section 8b selects either the video channel shifting mode or the audio channel shifting mode when the channel selection section 8b receives a mode selection indication for selecting either the video channel shifting mode or the audio channel shifting mode from the selection key or the switching key. In the video channel shifting mode, when the user operates the channel up or down key of the input device 11, only the video channels are successively shifted in the same manner described in the first embodiment. In the audio channel shifting mode, when the user operates the channel up or down key, only the audio channels are successively shifted in the same manner described in the first embodiment. With the channel selection section 8b, only the video channels or only the audio channels can be selected in accordance with the wishes of the user.

Moreover, in addition to the operation of the selection key or the switching key, the control unit 8 may always preferentially select the video channel shifting mode by default and shift to the audio channel shifting mode only when the selection key or the switching key is operated. Conversely, the control unit 8 may always preferentially select the audio channel shifting mode by default and shift to the video channel shifting mode only when the selection key or the switching key is operated.

(2) A power-saving mode for lowering a power consumption of the display device 12 is used when the audio channels are selected. Basically, when audio channels are selected, only music or spoken audio is outputted from the internal speaker of the display device 12 or the speaker device 15 and no images are displayed. Even if displayed, the images are simple images such as still images. Accordingly, when the audio channels are selected, the control section 8c lowers the brightness of the display device 12. For example, if the display device 12 is a CRT or the like, the brightness of the Braun tube is lowered. If the display device 12 is a liquid crystal television, the brightness of the back lighting is lowered. As a result, wasteful power consumption during the selection of audio channels can be suppressed.

(3) When the received sub-channel is an audio channel, the control section 8c may display an indicator indicating that the channel currently received is an audio channel on the display device 12. As a result, the user can easily recognize that the channel currently received is an audio channel.

(4) When the user operates the channel up or down key of the input device 11, the channels can be shifted in order of the virtual channel number instead of the physical channel number.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section,". "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A broadcast signal receiving device comprising:
    a receiving unit configured to receive digital broadcast signals including a plurality of sub-channels on each of a plurality of physical channels;
    a registering unit configured to register an indicator indicating whether or not each of the sub-channels is an audio channel in an indicator registration region of a channel map, which stores channel map information relating to a correspondence between the physical channels and the sub-channels; and
    a channel selection unit configured to select the sub-channels based on the channel map information and the indicator stored in the indicator registration region,
    the registering unit being further configured to register the indicator so as to determine video channels and audio channels,
    the channel selection unit being further configured to shift up or down only the video channels registered in the channel map by skipping the audio channels registered in the channel map based on the indicator in response to the channel selection unit receiving a channel selection indication for shifting up or down the sub-channels while shifting up or down the video channels, and
    the channel selection unit being further configured to shift up or down only the audio channels registered in the channel map by skipping the video channels registered in the channel map based on the indicator in response to the channel selection unit receiving the channel selection indication for shifting up or down the sub-channels while shifting up or down the audio channels.

2. The broadcast signal receiving device according to claim 1, wherein
    the registering unit is further configured to determine whether or not each of the sub-channels is the audio channel and register the indicator in the indicator registration region when one of the sub-channels is the audio channel.

3. The broadcast signal receiving device according to claim 2, wherein
    the registering unit is further configured to determine whether or not each of the physical channels is broadcast, acquire the channel map information for the physical channels that is determined to be broadcast and resister the channel map information in the channel map.

4. The broadcast signal receiving device according to claim 3, wherein
    the digital broadcast signals are digital broadcast signals conforming to ATSC (Advanced Television Systems Committee) standards, and
    the registering unit determines whether or not each of the sub-channels is the audio channel based on information in a PMT (program map table) conforming to the ATSC standards, or a VCT (virtual channel table) contained in a PSIP (program system and information protocol) conforming to the ATSC standards.

5. The broadcast signal receiving device according to claim 4, wherein
    the registering unit determines whether or not each of the sub-channels is the audio channel based on a description of a PCRPID (program clock reference packet identifier) or a VIDEOPID (packet identifier) contained in the PMT.

6. The broadcast signal receiving device according to claim 4, wherein
    the registering unit determines whether or not each of the sub-channels is the audio channel based on a description of an MPEG (Moving Picture Experts Group)-2 TS (transport stream) packet or an MPEG-2 PES (packetized elementary stream) packet, or an acquisition time of an MPEG-2 sequence header when audio signals of the sub-channels are demodulated.

7. The broadcast signal receiving device according to claim 4, wherein
    the registering unit determines whether or not each of the sub-channels is the audio channel based on a description of a PCRPID (program clock reference packet identifier) or service type contained in the VCT.

8. The broadcast signal receiving device according to claim 2, wherein
    the channel selection unit is further configured to selects either a video channel shifting mode in which only the video channels are shifted up or down or an audio channel shifting mode in which only the audio channels are shifted up or down when the channel selection unit receives a mode selection indication for selecting either the video channel shifting mode or the audio channel shifting mode.

9. The broadcast signal receiving device according to claim 2 further comprising
    a display control unit configured to lower a power consumption of a display unit displaying the digital broadcast signals when the channel selection unit selects the audio channels.

10. The broadcast signal receiving device according to claim 2 further comprising
    a display control unit configured to display information indicating that the sub-channel being received is the audio channel when the channel selection unit selects the audio channels.

11. A broadcast signal receiving device comprising:
a receiving unit configured to receive digital broadcast signals including a plurality of sub-channels on each of a plurality of physical channels;
a registering unit configured to register an indicator indicating whether or not each of the sub-channels is an audio channel in an indicator registration region of a channel map, which stores channel map information relating to a correspondence between the physical channels and the sub-channels; and
a channel selection unit configured to select the sub-channels based on the channel map information and the indicator stored in the indicator registration region,
the registering unit being further configured to determine whether or not each of the sub-channels is the audio channel and register the indicator in the indicator registration region when one of the sub-channels is the audio channel,
the registering unit being further configured to register the indicator so as to determine video channels and audio channels,
the channel selection unit being further configured to shift up or down only the video channels registered in the channel map or shift up or down only the audio channels registered in the channel map when the channel selection unit receives a channel selection indication for shifting up or down the sub-channels, and
an audio channel on a minimum channel being selected when the channel selection unit receives the channel selection indication for shifting up the sub-channel after the sub-channel received by the receiving unit reaches a video channel on a maximum channel.

12. The broadcast signal receiving device according to claim 11, wherein
an audio channel on a maximum channel is selected when the channel selection unit receives the channel selection indication for shifting down the sub-channel after the sub-channel received by the receiving unit reaches a video channel on a minimum channel,
the video channel on the minimum channel is selected when the channel selection unit receives the channel selection indication for shifting up the sub-channel after the sub-channel received by the receiving unit reaches the audio channel on the maximum channel, and
the video channel on the maximum channel is selected when the channel selection unit receives the channel selection indication for shifting down the sub-channel after the sub-channel received by the receiving unit reaches the audio channel on the minimum channel.

13. A broadcast signal receiving device comprising:
a receiving unit configured to receive digital broadcast signals including a plurality of sub-channels on each of a plurality of physical channels;
a registering unit configured to register an indicator indicating whether or not each of the sub-channels is an audio channel in an indicator registration region of a channel map, which stores channel map information relating to a correspondence between the physical channels and the sub-channels; and
a channel selection unit configured to select the sub-channels based on the channel map information and the indicator stored in the indicator registration region,
the registering unit being further configured to determine whether or not each of the sub-channels is the audio channel and register the indicator in the indicator registration region when one of the sub-channels is the audio channel,
the registering unit being further configured to register the indicator so as to determine video channels and audio channels,
the channel selection unit being further configured to shift up or down only the video channels registered in the channel map or shift up or down only the audio channels registered in the channel map when the channel selection unit receives a channel selection indication for shifting up or down the sub-channels, and
an audio channel on a maximum channel being selected when the channel selection unit receives the channel selection indication for shifting down the sub-channel after the sub-channel received by the receiving unit reaches a video channel on a minimum channel.

14. A broadcast signal receiving device comprising:
a receiving unit configured to receive digital broadcast signals including a plurality of sub-channels on each of a plurality of physical channels;
a registering unit configured to register an indicator indicating whether or not each of the sub-channels is an audio channel in an indicator registration region of a channel map, which stores channel map information relating to a correspondence between the physical channels and the sub-channels; and
a channel selection unit configured to select the sub-channels based on the channel map information and the indicator stored in the indicator registration region,
the registering unit being further configured to determine whether or not each of the sub-channels is the audio channel and register the indicator in the indicator registration region when one of the sub-channels is the audio channel,
the registering unit being further configured to register the indicator so as to determine video channels and audio channels,
the channel selection unit being further configured to shift up or down only the video channels registered in the channel map or shift up or down only the audio channels registered in the channel map when the channel selection unit receives a channel selection indication for shifting up or down the sub-channels, and
a video channel on a minimum channel being selected when the channel selection unit receives the channel selection indication for shifting up the sub-channel after the sub-channel received by the receiving unit reaches an audio channel on a maximum channel.

15. A broadcast signal receiving device comprising:
a receiving unit configured to receive digital broadcast signals including a plurality of sub-channels on each of a plurality of physical channels;
a registering unit configured to register an indicator indicating whether or not each of the sub-channels is an audio channel in an indicator registration region of a channel map, which stores channel map information relating to a correspondence between the physical channels and the sub-channels; and
a channel selection unit configured to select the sub-channels based on the channel map information and the indicator stored in the indicator registration region,
the registering unit being further configured to determine whether or not each of the sub-channels is the audio channel and register the indicator in the indicator registration region when one of the sub-channels is the audio channel,
the registering unit being further configured to register the indicator so as to determine video channels and audio channels, the channel selection unit being further configured to shift up or down only the video channels registered in the channel map or shift up or down only the audio channels registered in the channel map when the channel selection unit receives a channel selection indication for shifting up or down the sub-channels, and a video channel on a maximum channel being selected when the channel selection unit receives the channel selection indication for shifting down the sub-channel after the sub-channel received by the receiving unit reaches an audio channel on a minimum channel.

16. A broadcast signal receiving method comprising:

receiving digital broadcast signals including a plurality of sub-channels on each of a plurality of physical channels;

registering an indicator indicating whether or not each of the sub-channels is an audio channel in a indicator registration region of a channel map, which stores a channel map information relating to a correspondence between the physical channels and the sub-channels; and selecting the sub-channels based on the channel map information and the indicator stored in the indicator registration region, the registering of the indicator including registering the indicator so as to determine video channels and audio channels, the selecting of the sub-channels including shifting up or down only the video channels registered in the channel map by skipping the audio channels registered in the channel map based on the indicator in response to receiving a channel selection indication for shifting up or down the sub-channels while shifting up or down the video channels, and the selecting of the sub-channels further including shifting up or down only the audio channels registered in the channel map by skipping the video channels registered in the channel map based on the indicator in response to receiving the channel selection indication for shifting up or down the sub-channels while shifting up or down the audio channels.

* * * * *